United States Patent
Bryant et al.

[11] Patent Number: 5,821,412
[45] Date of Patent: Oct. 13, 1998

[54] APPARATUS AND METHOD FOR PROCESSING ENGINE MEASUREMENTS

[75] Inventors: Bruce David Bryant, Royal Oak; Kenneth Andrew Marko, Ann Arbor, both of Mich.; Jimi Sauw-Yoeng Tjong; David Mansfield Mathias, both of Windsor, Canada

[73] Assignee: Ford Global Technologies, Inc., Dearborn, Mich.

[21] Appl. No.: 288,103

[22] Filed: Aug. 9, 1994

[51] Int. Cl.⁶ .................................................. G01M 15/00
[52] U.S. Cl. ............................................................ 73/117.3
[58] Field of Search .................................. 73/116, 117.2, 73/117.3, 119 R, 572

[56] References Cited

U.S. PATENT DOCUMENTS

| | | | |
|---|---|---|---|
| 3,393,557 | 7/1968 | Brown et al. | 73/116 |
| 4,050,297 | 9/1977 | Pettingell et al. | 73/117.2 |
| 4,215,404 | 7/1980 | Bukhtiyarov et al. | 73/117.3 |
| 4,373,186 | 2/1983 | Marshall et al. | 73/117.3 |
| 4,448,063 | 5/1984 | Mudge et al. | 73/117.2 |
| 4,454,750 | 6/1984 | Yoshida et al. | 73/35 |
| 4,523,566 | 6/1985 | Kobayashi | 123/425 |
| 4,584,869 | 4/1986 | Frodsham | 73/35 |
| 4,643,023 | 2/1987 | Capps | 73/117.3 |
| 5,119,783 | 6/1992 | Komurasaki | 73/117.3 |
| 5,193,513 | 3/1993 | Marko et al. | 123/571 |
| 5,361,628 | 11/1994 | Marko et al. | 73/117.2 |

Primary Examiner—Richard Chilcot
Assistant Examiner—Eric S. McCall
Attorney, Agent, or Firm—Joseph W. Malleck; Roger L. May

[57] ABSTRACT

A diagnostic envelope is used to analyze measurements from an internal combustion engine. Measurements may be from a partially assembled engine during a cold test to detect subtle mechanical anomalies, or from a fully assembled engine during a cold test or a hot test (with active fuel and spark). The measurements represent vibrational amplitudes corresponding to various crankshaft angular positions of the internal combustion engine. The first step in generating the diagnostic envelope includes filtering the measurements to enhance local variations. Filtered measurements representing a number of engine cycles are then combined to reduce random cycle-to-cycle variations. The diagnostic envelope is then generated by subtracting corresponding measurements obtained from engines with known operating characteristics. The diagnostic envelope is used in analyzing and/or classifying the engine. A fuzzy logic classifier is used to detect subtle mechanical anomalies while principal component analysis is utilized in analyzing engine performance, detecting less subtle mechanical defects, and in designing and validating engines.

30 Claims, 5 Drawing Sheets

APPARATUS AND METHOD FOR PROCESSING ENGINE MEASUREMENTS

TECHNICAL FIELD

The present invention relates to a system and method for processing test measurements from a multi-cylinder engine which includes constructing a diagnostic signal for use as a diagnostic or performance evaluation tool.

BACKGROUND ART

As increasingly demanding performance requirements are imposed upon internal combustion engines in areas such as fuel economy and emissions control, innovative fault detection and diagnosis strategies are necessitated. Whether testing is performed during manufacturing and assembly, or during normal engine operation, the intricacies of the engine coupled with a typically hostile testing environment often mask subtle mechanical or operational anomalies. Thus, a number of specialized systems and methods have been developed for diagnostic and performance testing of internal combustion engines.

In a number of applications, time is of the essence in detecting and identifying the source of any anomaly so as to preclude adverse consequences. For example, during manufacturing and assembly of an internal combustion engine, expedient discovery of a nonconforming, misassembled, or maladjusted component reduces the cost of correcting that deficiency by minimizing the number of subsequent processes performed on the component or engine. Furthermore, easily correctable mechanical anomalies which are not detected and corrected in a timely manner may eventually lead to malfunctions which require more substantial repairs. Thus, prompt detection, identification, and correction of anomalies is a primary concern in reducing costs and maintaining customer satisfaction.

In testing internal combustion engines, some previously developed systems and methods apply frequency analysis techniques, such as Fourier analysis, to any of a number of time-based signals obtained from the engine, such as exhaust pressure, oil pressure, intake pressure, or the like. Other systems have utilized vibrational analysis in examining variance of vibrational amplitudes measured during different engine cycles at particular crankshaft angles.

The availability of increasingly more powerful microprocessors has enabled the utilization of principal component analysis (PCA) to examine engine signals. PCA allows the original signals to be represented in a more compact form while maintaining their stochastic nature by creating an ordered variance among signal components (as explained in greater detail below). However, even those previously developed systems and methods which utilize PCA have difficulty discerning very subtle aberrations from random noise and systematic variation.

SUMMARY OF THE INVENTION

It is an object of the present invention to provide a system and method for analyzing measurements from an internal combustion engine capable of detecting and identifying subtle mechanical or operational anomalies.

In carrying out this and other objects of the present invention, a method is provided for analyzing measurements from an internal combustion engine having a rotatable crankshaft wherein each measurement corresponds to an angular position of the crankshaft. The method includes examining local variation among contiguous measurements by filtering the measurements to produce a series of filtered measurements wherein each filtered measurement represents a predetermined number of neighboring measurements. The filtered measurements corresponding to a particular angular position of the crankshaft are then combined to reduce the effect of random noise in the measurements. A diagnostic envelope is then produced by subtracting one of a series of predetermined values, each representing systematic vibrational activity at a particular angular position of the crankshaft, from each corresponding combined measurement to reduce systematic variations from the measurements. Since the diagnostic envelope is indicative of engine condition, it may be presented to a fuzzy classifier to classify the engine, or subjected to PCA to provide a performance indicator or detect less subtle anomalies.

A system is also provided for carrying out the method of the present invention.

In the preferred embodiment, the system and method of the present invention are utilized to analyze vibrational amplitude measurements from a partially assembled internal combustion engine to detect maladjusted connecting rod nuts. Since this particular anomaly is relatively subtle, this analysis is performed only if other, more apparent, anomalous conditions have not been detected.

The advantages accruing to the present invention are numerous. For example, the present invention provides increased sensitivity to very subtle anomalous conditions in internal combustion engines thereby allowing prompt detection, identification, and correction of those conditions. The present invention may be utilized as a preprocessor in cooperation with previously developed techniques for classifying engines as normal or irregular. The present invention does not require prior knowledge of anomalous conditions in order to detect such conditions so the invention may be utilized for a variety of different engines which may be partially or fully assembled. The present invention also provides a compact representation of measurements which maintains their stochastic nature.

The above object and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
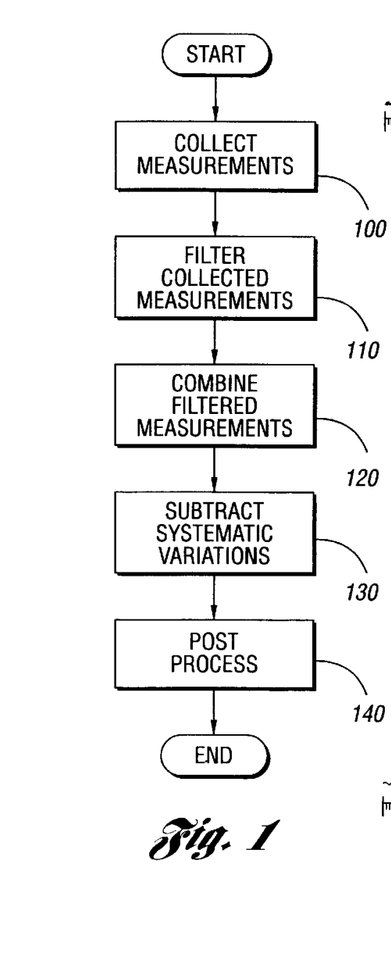
FIG. 1 is a flow chart illustrating a method of forming a diagnostic envelope according to the present invention.

Referring now to FIG. 1, a flow chart is shown illustrating a method of forming a diagnostic envelope according to the present invention. In the preferred embodiment, measurements represent vibrational amplitude signals generated by at least one accelerometer which contacts an internal combustion engine at one or more strategic locations. Preferably, the locations are chosen to maximize the amplitude of vibrational activity to improve the signal to noise ratio of the measurements. The engine may be either partially or fully assembled. Furthermore, the engine may be cranked at a predetermined speed by an external motor (cold test), or the engine may be operating with spark and fuel (hot test). The method may be applied to any of a number of signals which represent operational characteristics of an engine, or similarly complex electro-mechanical system.

Step 100 of FIG. 1 includes collecting and storing measurements which will be utilized to generate the diagnostic envelope. Each measurement represents the magnitude of vibrational activity at a corresponding angular position of the crankshaft. Measurements are collected for a predetermined number of crankshaft revolutions or engine cycles (with a four-cycle engine having two revolutions per engine cycle). Preferably, 1024 measurements are collected for each revolution during four (4) engine cycles. The number of measurements may be supplemented by terminal values to eliminate boundary effects. This is accomplished by appending a number of values equal to the first measurement prior to the first measurement and the same number of values equal to the last measurement after the last measurement.

The measurements are filtered at step 110 of FIG. 1 so as to examine local variation among contiguous measurements. Step 110 produces a series of filtered measurements wherein each filtered measurement represents a predetermined number of neighboring contiguous measurements. This provides consistent and objective means for representing the vibrational activity of the engine under test. As with other steps of the method, filtering step 110 may be accomplished by hardware, software, or a combination of hardware and software. In the preferred embodiment, step 110 is implemented in software.

Preferably, each filtered measurement is equal to the standard deviation of a group of seven (7) neighboring contiguous measurements. The group includes the measurement corresponding to an angular position of the crankshaft, the three preceding measurements, and the three subsequent measurements. Depending on the particular application, the size of the group or the filtering function may be changed to optimize detection of selected anomalies. For example, the group may include eight (8) neighboring measurements composed of the measurement corresponding to an angular position of the crankshaft, five (5) preceding measurements, and two (2) subsequent measurements. Likewise, the filtering function may average the eight (8) measurements, or a more sophisticated filtering function may be utilized.

Step 120 of FIG. 1 includes combining filtered measurements from a predetermined number of engine cycles which correspond to the same angular position of the crankshaft. This step is performed to strengthen the systematic (regular and predictable) components while removing noise and other asystematic phenomena. Preferably, the measurements are combined by determining the average value of the measurements on an angular basis (of the crankshaft). Of course, another operator could be used to combine the measurements, such as determining the median of the measurements.

The resulting waveform composed of the combined measurements is referred to as the "average envelope" and represents the vibrational activity of the engine over one engine cycle (one revolution for a two-cycle engine). Each measurement in the "average" envelope, then, corresponds to the average vibrational activity associated with a corresponding angular position of the crankshaft. If an alternate operator is used to combine the measurements, the resulting envelope may be named accordingly.

The diagnostic envelope is generated from the average envelope at step 130 of FIG. 1 by removing the systematic vibrational artifacts from the average envelope. At step 130, each of a series of predetermined values representing systematic vibrational activity at a particular angular position of the crankshaft is subtracted from a corresponding value of the average envelope. The series of predetermined values is produced by applying steps 110 and 120 to each of a predetermined number of engines having known operating characteristics. The average envelopes from the group of engines are then combined to generate the series of values. Preferably, the engines comprising the group are certified engines which are free of operational anomalies and represent "normal" engines. The average envelopes may be combined by computing a point-by-point arithmetic mean, median, or other similar operation.

Removal of the systematic vibrational activity present in normal operating engines accentuates differences between the group of representative engines and the engine under test. This enables detection of subtle operating anomalies which may otherwise be masked.

Step 130 of FIG. 1 also includes clipping the measurement values at zero where necessary to avoid spurious indications of negative accelerometer activity. Thus, subtracting each of the series of predetermined values from a corresponding value in the average envelope includes assigning a value of zero to any point within the diagnostic envelope whose value would otherwise be less than zero.

Figure 3A:
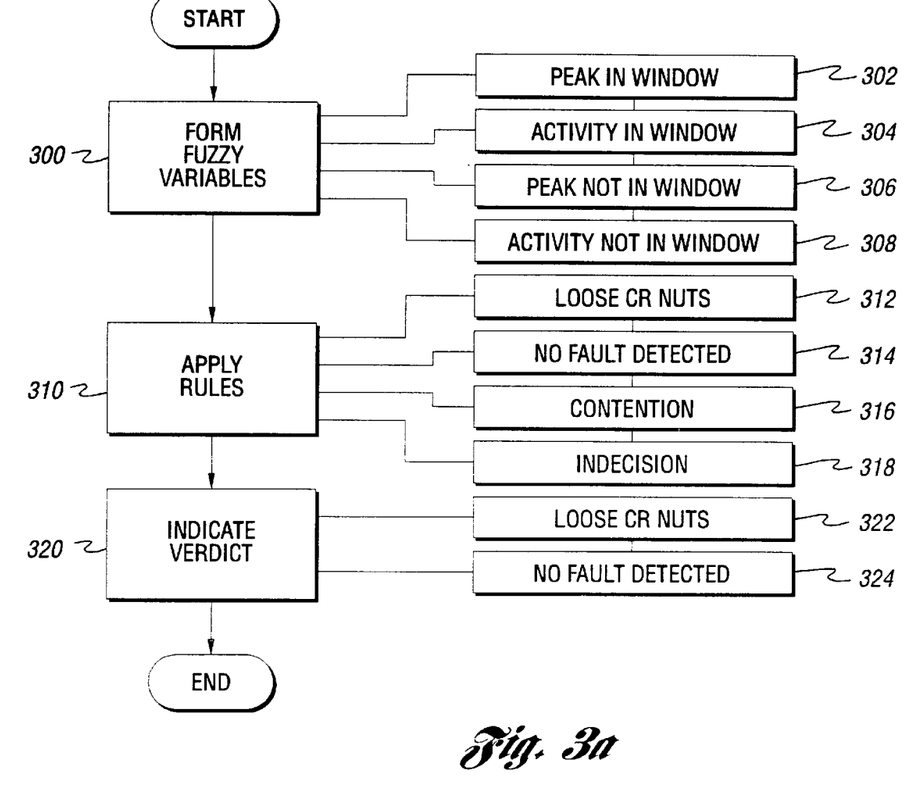
FIGS. 3a and 3b illustrate a hybrid fuzzy logic classifier which utilizes a diagnostic envelope to classify engines by detecting particularly subtle faults, such as loose CR nuts.
Figure 3B:
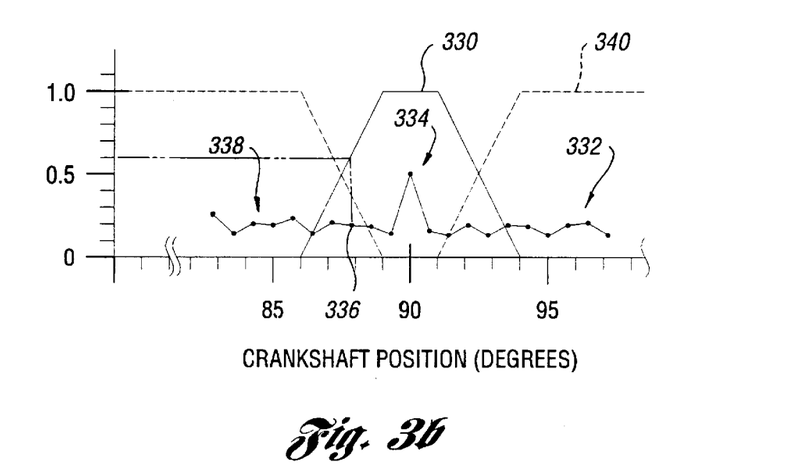

The diagnostic envelope, then, is a representation of the difference in vibrational activity, on an angular basis, between the engine under test and a normal engine. Step 140 of FIG. 1 includes post-processing of this representation for various applications. For example, step 140 may include utilizing a classifier, such as a fuzzy logic classifier, a cluster-based classifier, a neural network, or the like, to interpret the diagnostic envelope to determine whether the engine under test is free of operational anomalies. One such classifier is illustrated in FIGS. 3a and 3b and is explained in greater detail below.

Figure 4A:
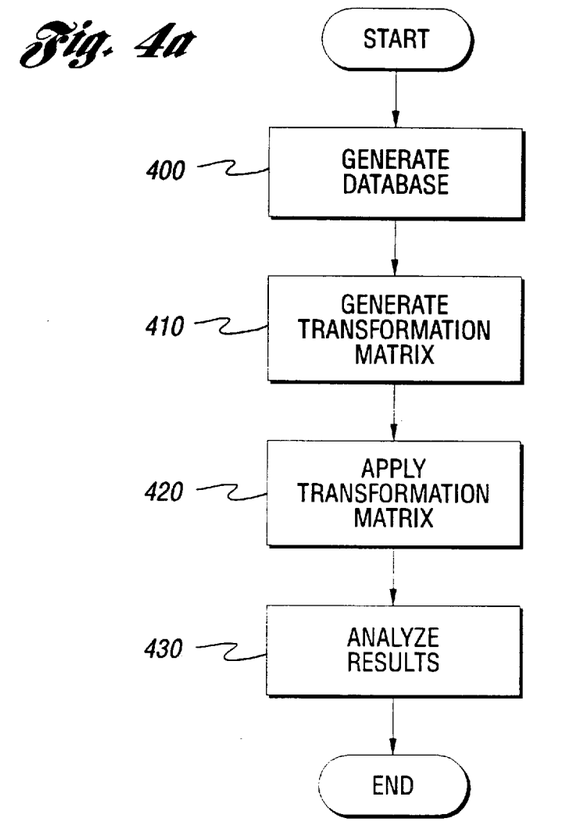
FIGS. 4a and 4b illustrate the application of principal component analysis to a diagnostic envelope.
Figure 4B:
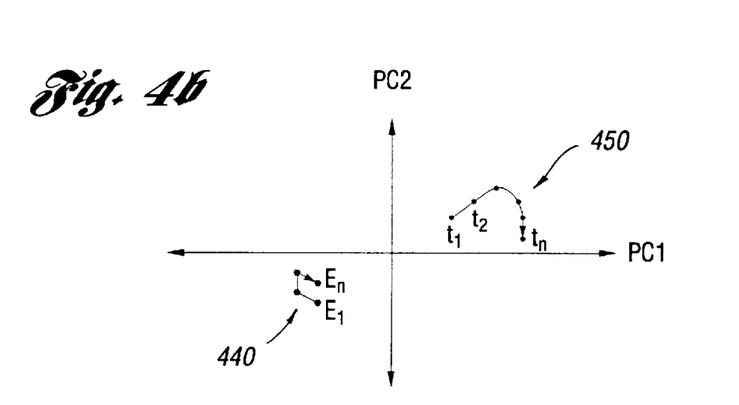

The post-processing at step 140 of FIG. 1 may also include applying principal component analysis (PCA) to the diagnostic envelope. The results may be utilized in designing and validating engines by monitoring operating trends of a particular engine or group of engines over time. Alternatively, the results may be used for fault detection and identification, or for process control applications. Utilization of PCA is illustrated in FIGS. 4a and 4b and described in greater detail below.

Figure 2A:
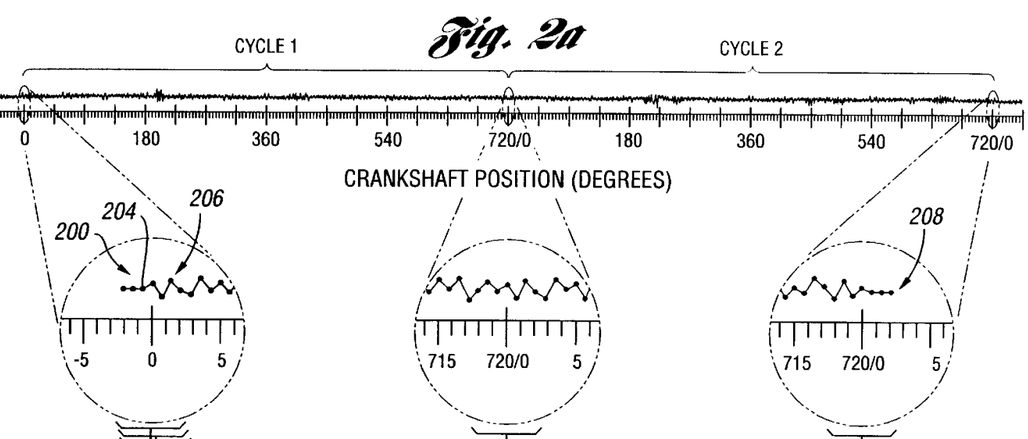
FIGS. 2a–2e illustrate the method of FIG. 1 applied to representative vibrational measurements from an internal combustion engine.

FIGS. 2a–2e illustrate application of the method of FIG. 1 to representative measurements depicting vibrational activity of a four-cycle internal combustion engine. FIG. 2a represents the unprocessed amplitude measurements collected from an accelerometer in contact with an engine block of the engine under test. Each measurement corresponds to a particular angular position of the crankshaft. As shown in FIG. 2a, the measurements have been extended to eliminate boundary effects by appending values 200 and 202 to the beginning and end of the measurements, respectively. Preferably, 1024 measurements are collected for each revolution of the crankshaft during a cold test. Also preferably, the crankshaft of the engine under test is rotated by an external motor at speeds ranging from about 250 revolutions per minute (rpm) to about 400 rpm. Of course, collection of data at higher sampling rates may reveal an improved signal to noise ratio thereby allowing increased detection sensitivity.

Figure 2B:
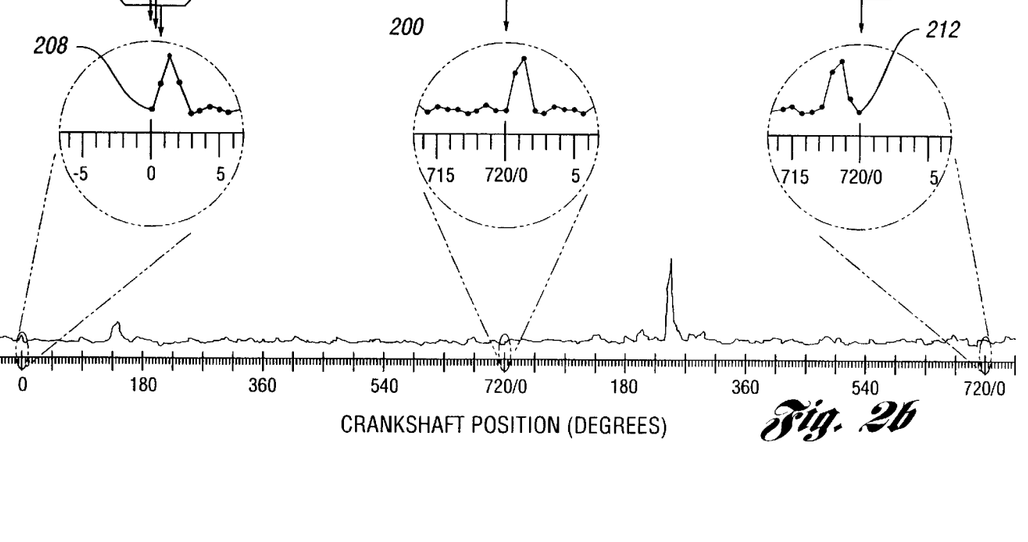

The measurements of FIG. 2a are filtered by computing the standard deviation of seven (7) contiguous measurements to produce the waveform of FIG. 2b. Thus, the value of filtered point 208, corresponding to a crankshaft angle of 0°, is equal to the standard deviation of points 200, point 204, and points 206 (three (3) points subsequent to point 204). The filter is applied in a similar manner to all the measurements of FIG. 2a to produce the waveform of FIG. 2b. Preferably, measurements are obtained during four (4) consecutive engine cycles spanning eight (8) revolutions of the crankshaft. However, only two (2) representative engine cycles are illustrated in FIGS. 2a and 2b.

Figure 2C:
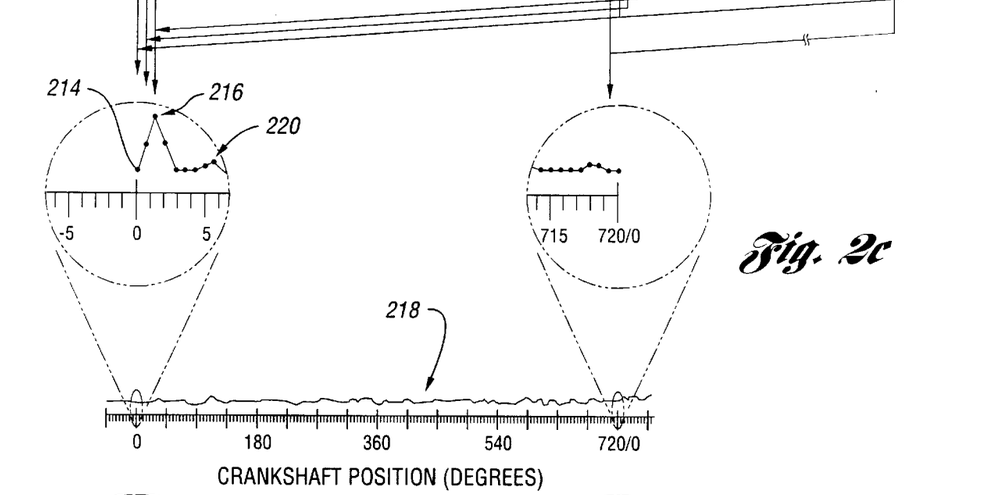

The measurements for corresponding angular positions of the crankshaft over four (4) engine cycles are combined to produce the waveform of FIG. 2c. Thus, point 214 represents the average of points 208, 210, 212, and other points corresponding to a crankshaft position of 0° not specifically illustrated. Note that points 208, 210, and 212 are used to calculate an average measurement corresponding to a crankshaft angular position of 0° or 720°. The combination of the values of FIG. 2b to produce the waveform of FIG. 2c strengthens systematic variations, such as peak 216, while reducing asystematic (random) variations 218.

Figure 2D:
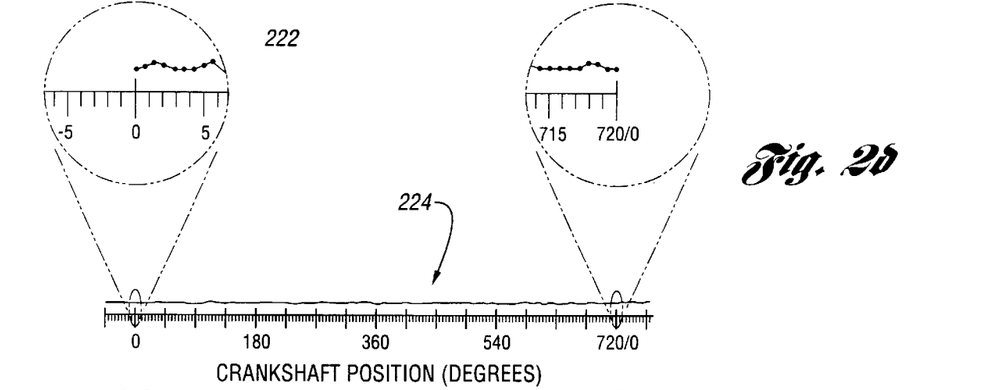
Figure 2E:
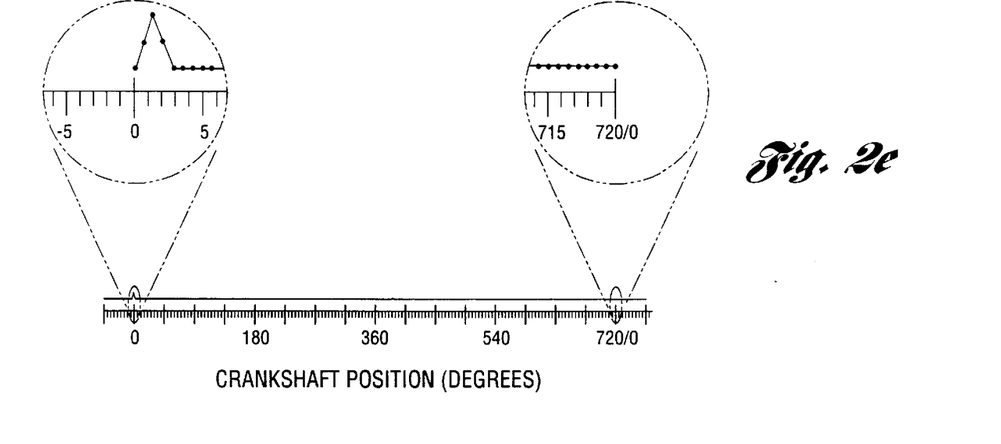

FIG. 2d illustrates a systematic envelope produced by averaging together a set of average envelopes obtained from a group of certified defect-free engines. The systematic envelope is then subtracted from the average envelope of FIG. 2c to produce the diagnostic envelope of FIG. 2e. For example, peak 220 of FIG. 2c would be removed by subtracting the waveform of FIG. 2d since peak 222 (representing systematic activity) corresponds in amplitude and position to peak 220. Likewise, random noise 218 would be reduced by subtracting random noise 224. Thus, the diagnostic envelope illustrated in FIG. 2e represents deviation from normal by removing random noise and systematic activity.

The systematic envelope may be recomputed periodically to reflect changes in the testing environment. Different systematic envelopes may be utilized for various engine models, test machines, or to reflect cyclic changes in systematic vibrational activity. For example, in a manufacturing and assembly application having multiple engine models on the same manufacturing or assembly line, a different systematic envelope may be used for each engine model.

Referring now to FIGS. 3a and 3b, a method of post-processing which classifies engines utilizing a diagnostic envelope and a hybrid fuzzy logic classifier is illustrated. In a preferred embodiment of the present invention, a hybrid fuzzy logic classifier is utilized during a cold test of a partially assembled engine which has passed other tests which detect more apparent operating anomalies. The hybrid fuzzy logic classifier is used to detect loose nuts which secure the connecting rods (CR's) to the crankshaft. The classifier considers the location of vibrational activity, as well as the magnitude of the activity, to classify engines. A true fuzzy logic system applies fuzzy rules to fuzzy variables (fuzzy sets) to produce a result. The result is then defuzzified (interpreted) in order to produce a meaningful result. The method illustrated in FIGS. 3a and 3b is a hybrid method since it applies conventional rules to fuzzy variables. Of course, a true fuzzy logic classifier could also be utilized to analyze the diagnostic envelope.

Step 300 of FIG. 3a includes evaluating fuzzy variables 302–308. Fuzzy variable 302, "Peak In Window", represents the degree to which the diagnostic envelope contains at least one peak having a location corresponding to a particular angular position of the crankshaft. Vibrational activity in such regions is indicative of various anomalous conditions of the engine, such as loose CR nuts or a missing bearing.

A representative membership function for a typical fuzzy variable is illustrated in FIG. 3b. Membership function 330 is utilized to evaluate the degree to which diagnostic envelope 332 contains a peak 334 within an angular window between 86° and 94°. To evaluate fuzzy variable 302, the value of each measurement is multiplied by a corresponding membership function and summed. Since peak 334 occurs where the corresponding membership function has a value of unity, the peak is entirely within the designated window and its value remains unchanged. In contrast, the value of point 336 is multiplied by 0.6 since the corresponding angular position is less likely to indicate an anomaly. Measurements located outside windows of interest, such as points 338, are multiplied by zero so as not to influence the fuzzy variable. Thus, the contribution of each measurement to a particular fuzzy variable is scaled by the corresponding membership function. Of course, any of a number of possible membership functions may be utilized in the place of the function depicted in FIG. 3b. For example, a parabolic, hyperbolic, exponential, or piecewise linear function may be employed.

Returning now to FIG. 3a, fuzzy variable 304, "Activity In Window" represents the degree to which vibrational activity located proximate to a predetermined angular position dominates the remaining vibrational activity of the diagnostic envelope. This variable is evaluated by calculating the ratio of the integral of values proximate to a predetermined angular position to the integral of remaining values not located near positions of interest. The integrals are evaluated with respect to angular position of the crankshaft and may be scaled depending on the particular application.

Fuzzy variable 306, "Peak Not In Window", represents the degree to which peaks in vibrational activity do not appear in any angular window of interest, such as those locations indicative of loose CR nuts. Therefore, fuzzy variable 306 is complementary to fuzzy variable 302 and has a corresponding complementary membership function 340 (FIG. 3b). Evaluation of fuzzy variable 306 proceeds in a manner analogous to evaluation of fuzzy variable 302.

As also illustrated in FIG. 3a, step 300 includes evaluation of fuzzy variable 308, "Activity Not In Window". Fuzzy variable 308 represents the degree to which the amount of vibrational activity proximate to certain predetermined angular locations does not dominate the amount of vibrational activity away from those locations. Fuzzy variable 308 is complementary to fuzzy variable 304 and is evaluated in an analogous fashion.

Conventional rules are applied to the fuzzy variables at step 310 of FIG. 3a. Rule 312, "Loose CR Nuts", indicates the presence of loose CR nuts if the peaks in the diagnostic envelope are in locations typical for loose CR nuts and the vibrational activity proximate to those locations dominates the diagnostic envelope. The fuzzy "AND" operator is simulated by multiplication, i.e. if (Peak In Window 302)× (Activity In Window 304) exceeds a first threshold value, then indicate loose CR nuts. Rule 312 is implemented once for each cylinder.

With continuing reference to FIG. 3a, rule 314, "No Fault Detected" indicates the peaks in the diagnostic envelope are not in locations typical of loose CR nuts and the vibrational activity outside certain angular windows typical for loose CR nuts dominates the total vibrational activity in the diagnostic envelope. Again, the fuzzy "AND" operator is simulated by multiplication, i.e. if (Peak Not In Window 306)×(Activity Not In Window 308) exceeds a second threshold value, then indicate no fault detected. Rule 314 is implemented (evaluated) only once during each test.

If rule 312 and rule 314 both have positive indications, i.e. both evaluations exceed corresponding threshold values, Contention rule 316 determines which rule prevails. Preferably, rule 314 prevails if both rule 312 and rule 314 have positive indications. However, judicious choices of angular windows, thresholds, and membership functions should preclude the necessity of Contention rule 316. In a similar fashion, if neither rule 312 nor rule 314 produces a positive indication, Indecision rule 318 selects the more probable outcome by preferring the rule having the higher value (result of multiplication).

Step 320 of FIG. 3a classifies the engine under test by indicating a final verdict as determined by the rules of step 310. Verdict 322 indicates that loose CR nuts have been detected. Preferably, the classifier identifies at least one pair of opposing cylinders (i.e. cylinders 1 and 5, 2 and 6, or 3 and 4 for a six cylinder engine) which are responsible for the verdict. Also preferably, each pair of opposing cylinders has a corresponding threshold value used to apply the rules of step 310.

Verdict 324 of FIG. 3a indicates that no faults have been detected. In the preferred embodiment, the fuzzy logic-based classifier is utilized to detect very subtle operational anomalies. As such, other more apparent faults are detected earlier in the test sequence.

Referring now to FIGS. 4a and 4b, application of PCA to a diagnostic envelope according to the present invention is shown. PCA is a well-known statistical processing technique which is described in I. T. Jolliffe, *Principal Component Analysis,* Springer-Verlag, 1986. PCA is utilized to reduce or simplify the representation of data while maintaining the majority of information present in the data. A relatively large data set may be reduced to a manageable set of parameters referred to as principal components (PCs). Preferably, PCA is utilized to analyze data collected during a hot test to detect more apparent mechanical anomalies. PCA may also be utilized in design, validation, and performance testing of engines, as explained in greater detail below.

In general, PCA includes determining a linear transformation which maps data to a new n-dimensional space having properties desirable for diagnostics. One such desirable property is that PCA creates an "ordered variance" which maximizes separability of elements comprising a data vector along mutually orthogonal axes. For example, after transformation to an n-dimensional PCA space, the projection of a point along a first axis (PC1) represents the largest variance of one element. The projection of the same point along a second axis (PC2) represents the largest remaining variance of another element, etc. Thus, only a predetermined number of PCs need to be examined to discern a normal engine from an anomalous engine.

In addition to PCA, any of a variety of other methods may be utilized to represent a large number of data points with a relatively smaller number of parameters while maintaining desired characteristics of the data points. For example, simply computing the average of the data points reduces the data points to a single parameter which may be desirable for a particular application. Likewise, for a different application, determining a standard deviation of all the data points or predetermined subsets of the data points may preserve the desired characteristics. Since more sophisticated transformations, such as those involved in PCA, require a large number of complex computations, they are typically determined prior to the actual testing using representative samples or models. The predetermined transformation is then applied to the collected data during an actual test.

Returning now to FIG. 4a, step 400 includes generating a database containing the diagnostic envelopes from a representative set of similar internal combustion engines collected during various running conditions. This database is utilized at step 410 to generate a linear transformation matrix used to map collected data to the PCA space. Preferably, the database and transformation matrix generated by steps 400 and 410 are generated prior to actual testing and stored for subsequent use. Step 420 then applies the transformation matrix to data collected from the engine under test to map the data to a PCA space. Step 430 analyzes the position of the points in PCA space to provide fault detection, fault identification, an indication of engine performance, or the like.

In the preferred embodiment, analysis of the results at step 430 includes storing PCs extracted from the diagnostic envelopes of a representative set of similar engines having known operating characteristics. For example, PCs representing properly running engines would be stored in addition to PCs representing engines with known operating anomalies, such as knocking or the like. The position in n-dimensional PCA space of the PCs representing the engine under analysis are then compared to the previously stored PCs representing engines having known operating characteristics.

Alternatively, PCs from a representative set of similar internal combustion engines may be used to tune the parameters of a trainable classifier, such as a neural network. The trainable classifier may then be used to assess engine performance or to detect and identify operating anomalies.

FIG. 4b illustrates another alternative embodiment for analyzing points in a two-dimensional PCA space. Points indicated generally by reference numeral 440 depict PCs representing a sequence of engines ($E_1$ to $E_n$). Analysis may include monitoring change of the spatial position within PCA space of each principal component for the sequence of engines. The trajectory created by such a change in position illustrates trends which may be utilized for manufacturing or assembly process control.

With continuing reference to FIG. 4b, points indicated generally by reference numeral 450 depict PCs representing a temporal sequence (from time $t_1$ to time $t_n$) of measurements obtained from the same engine. Monitoring change in spatial position of the PCs for a particular internal combustion engine during a predetermined period of time provides information useful in designing and validating new engines. One trajectory generated by the changing position of the PCs may represent a normal change during break-in of the engine while a different trajectory may indicate unacceptable wear of engine components.

Figure 5:
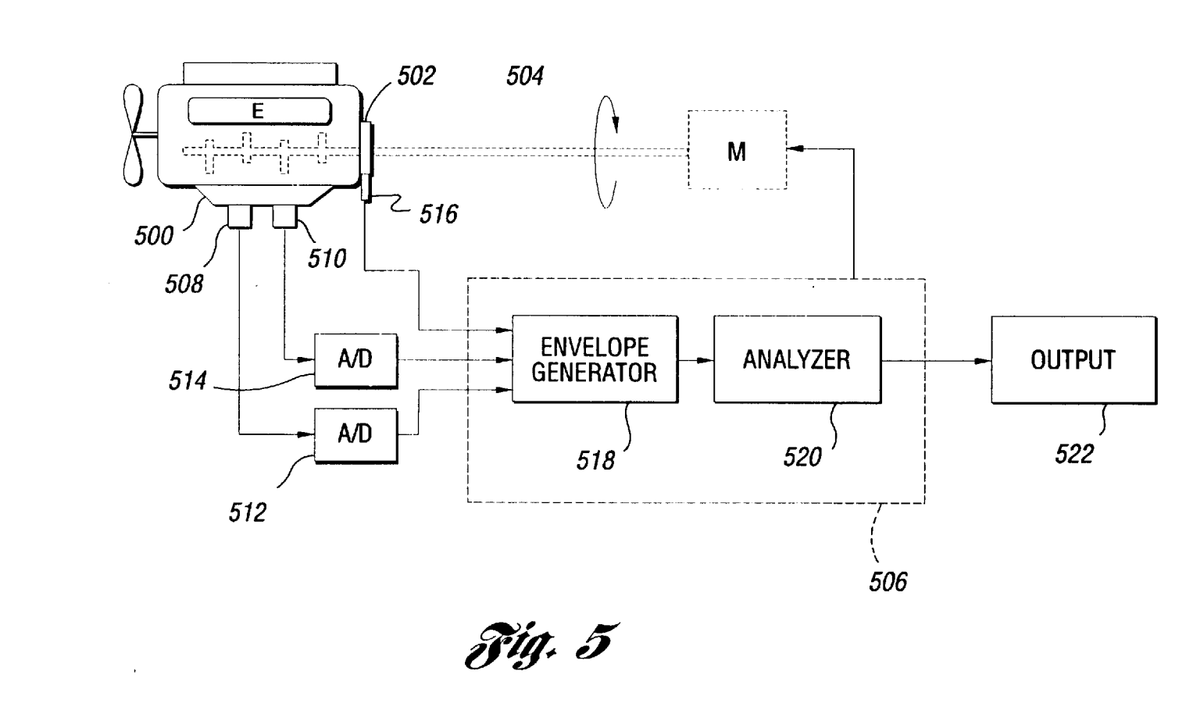
FIG. 5 is a block diagram of a system for forming a diagnostic envelope according to the present invention.

FIG. 5 is a diagrammatical representation of a system used to generate and analyze a diagnostic envelope according to the present invention. Engine E represents either a partially or a fully assembled engine under test. Preferably, a partially assembled engine includes an engine block 500, crankshaft 502, bearings, connecting rods, and piston assemblies. During a cold test, motor M rotates crankshaft 502 via linkage 504. Motor M is controlled by processor 506 and/or an optional motor controller (not shown).

With continuing reference to FIG. 5, transducers 508,510, such as accelerometers contact engine block 500 to sense vibrational activity of engine E and to generate signals representative of such. Each transducer 508,510 is in communication with a corresponding analog to digital (A/D) converter 512,514, respectively. A/D converters 512,514 transform analog signals to corresponding digital signals for input to processor 506, as is well known in the art. Position sensor 516 generates a signal indicative of the position of crankshaft 502 which is communicated to processor 506. This allows association of vibrational measurements captured by transducers 508,510 with the angular position of crankshaft 516. Alternatively, a position sensor may be linked to motor M or linkage 504.

As also shown in FIG. 5, processor 506 includes a diagnostic envelope generator 518, an analyzer 520, and a data storage device, such as memory, magnetic disk, or the like (not shown). Output 522 communicates the results of analyzer 520 to a user or subsequent process.

In operation, during a cold test, motor M rotates crankshaft 502 a predetermined number of times at a predetermined rate. Preferably, the predetermined rate ranges between about 250 rpm and 400 rpm. While crankshaft 516 is rotating, transducers 508,510 generate analog signals representative of vibrational activity of engine E. The analog signals are converted to digital signals by A/D converters 512,514 and communicated to processor 506. Simultaneously, position sensor 516 senses the angular position of crankshaft 502 and transmits this information to processor 506 which associates the angular position with the vibrational activity. Diagnostic envelope generator 518 utilizes the various signals to generate a diagnostic envelope for engine E. Analyzer 520 evaluates the diagnostic envelope utilizing a fuzzy logic based classifier, PCA, or other similar diagnostic tool. Results of the analysis are communicated to a user or a subsequent process via output 522 which may include a video display, printer, or the like.

The system of FIG. 5 may also be utilized without motor M and linkage 504 during a hot test of a fully assembled engine E. Data gathering and analysis during a hot test proceeds in an analogous fashion to the operation of the system during a cold test. A hot test may be performed on a fully assembled engine (without final dress items) in an assembly environment, or after the engine is installed and fully operational in a vehicle.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. A method for processing measurements from an internal combustion engine having a rotatable crankshaft wherein each measurement corresponds to an angular position of the crankshaft, the method comprising:

filtering the measurements to produce a series of filtered measurements wherein each filtered measurement represents a predetermined number of neighboring measurements so as to examine local variation among contiguous measurements;

combining filtered measurements which correspond to a particular angular position of the crankshaft to produce combined measurements having reduced random noise; and subtracting one of a series of predetermined values each representing systematic activity at a particular angular position of the crankshaft from each corresponding combined filtered measurement to reduce systematic variation present within the measurements so as to produce a diagnostic envelope which allows both detection and identification of engine operating anomalies.

2. The method of claim 1 further comprising classifying the internal combustion engine based on the diagnostic envelope.

3. The method of claim 2 wherein classifying the engine comprises:

applying a transformation matrix to the diagnostic envelope so as to represent the diagnostic envelope with a predetermined number of parameters; and comparing each of the predetermined number of parameters to corresponding parameters representing a plurality of diagnostic envelopes generated utilizing a group of internal combustion engines having known operating characteristics.

4. The method of claim 2 wherein classifying the engine comprises:

applying a transformation matrix to the diagnostic envelope so as to represent the diagnostic envelope with a predetermined number of principal components;

determining a spatial position of each predetermined number of principal components within a principal component space; and monitoring change of the spatial position of each predetermined number of principal components within the principal component space.

5. The method of claim 4 wherein monitoring change of the spatial position comprises comparing the spatial position of each of the predetermined number of principal components to corresponding spatial positions of principal components of at least one previously analyzed internal combustion engine.

6. The method of claim 2 wherein classifying the internal combustion engine comprises applying a fuzzy logic classifier to the diagnostic envelope.

7. The method of claim 6 wherein the internal combustion engine includes a plurality of cylinders and wherein applying a fuzzy logic classifier to the diagnostic envelope comprises:

for each of the plurality of cylinders, determining proximity of peak values of the diagnostic envelope to a particular angular position of the crankshaft which is indicative of a particular condition of the internal combustion engine and determining a ratio of the diagnostic envelope values within a window of the particular angular position of the crankshaft to the diagnostic envelope values outside the window; and determining proximity of peak values of the diagnostic envelope outside each window to the particular angular position of the crankshaft which is not indicative of the particular condition of the internal combustion engine and determining a ratio of the diagnostic envelope values outside the windows to all the diagnostic envelope values.

8. The method of claim 6 wherein the internal combustion engine includes a plurality of cylinders and wherein applying a fuzzy logic classifier to the diagnostic envelope comprises:

for each of the plurality of cylinders, indicating a first condition of the internal combustion engine if the diagnostic envelope includes a peak having a location associated with at least one predetermined angular position of the crankshaft and if values of the diagnostic envelope having a location proximate to the at least one predetermined angular position of the crankshaft dominate the diagnostic envelope; and indicating a second condition of the internal combustion engine if the diagnostic envelope includes a peak having a location not associated with the at least one predetermined angular position of the crankshaft and if values of the diagnostic envelope not having a location proximate to the particular angular position of the crankshaft dominate all the values of the diagnostic envelope.

9. The method of claim 8 wherein indicating a first condition includes representing the peak with a fuzzy variable having a membership function with nonzero values corresponding to locations within a predetermined proximity of the at least one predetermined angular position of the crankshaft and zero values elsewhere.

10. The method of claim 8 wherein indicating a first condition includes determining a ratio of an integral with respect to angular position of the crankshaft, of values proximate to the at least one predetermined position of the crankshaft, to an integral with respect to angular position of the crankshaft, of substantially all values of the diagnostic envelope.

11. The method of claim 1 wherein filtering the measurements includes determining a standard deviation of the predetermined number of neighboring measurements.

12. The method of claim 1 wherein each measurement represents a vibrational amplitude of the internal combustion engine at a particular angular position of the crankshaft.

13. The method of claim 12 wherein each measurement comprises a signal generated by an accelerometer in contact with the internal combustion engine.

14. The method of claim 1 further comprising:
supplementing the measurements with terminal values, before performing the step of filtering the values, to eliminate boundary effects.

15. The method of claim 1 wherein the series of predetermined values is produced by:
applying the step of filtering the measurements and the step of combining the filtered measurements to a predetermined number of internal combustion engines having known operating characteristics; and
consolidating the combined filtered measurements from each of the predetermined number of internal combustion engines.

16. The method of claim 1 wherein subtracting one of a series of predetermined values includes assigning a value of zero to a particular point within the diagnostic envelope if the value would otherwise be less than zero.

17. The method of claim 1 wherein the internal combustion engine is partially assembled and the measurements are generated during a cold test of the internal combustion engine.

18. The method of claim 1 further comprising:
generating a transformation matrix for use in representing the diagnostic envelope with a predetermined number of principal components; and
classifying the internal combustion engine based on the transformation matrix and the diagnostic envelope.

19. The method of claim 18 wherein classifying the internal combustion engine comprises:
applying the transformation matrix to the diagnostic envelope so as to represent the diagnostic envelope with a predetermined number of principal components; and comparing each of the predetermined number of principal components to corresponding principal components representing a plurality of diagnostic envelopes generated utilizing a group of internal combustion engines having known operating characteristics.

20. The method of claim 19 wherein comparing each of the predetermined number of principal components comprises comparing a spatial position of each principal component to a spatial position of a corresponding principal component representing a group of internal combustion engines having known operating characteristics.

21. The method of claim 19 further comprising passing the predetermined number of principal components through a neural network.

22. A system for processing measurements from an internal combustion engine having a rotatable crankshaft wherein each measurement corresponds to an angular position of the crankshaft, the system comprising:
means for filtering the measurements to produce a series of filtered measurements wherein each filtered measurement represents a predetermined number of neighboring measurements so as to examine local variation among contiguous measurements;
means for combining filtered measurements which correspond to a particular angular position of the crankshaft so as to reduce random noise within the measurements; and
means for subtracting one of a series of predetermined values each representing systematic activity at a particular angular position of the crankshaft from each corresponding combined filtered measurement to reduce systematic variation present within the measurements so as to produce a diagnostic envelope indicative of engine condition.

23. The system of claim 22 further comprising means for classifying the internal combustion engine based on the diagnostic envelope.

24. The system of claim 23 wherein the means for classifying the internal combustion engine comprises:
means for applying a transformation matrix to the diagnostic envelope so as to represent the diagnostic envelope with a predetermined number of principal components; and
means for comparing each of the predetermined number of principal components to corresponding principal components representing a plurality of diagnostic envelopes generated utilizing a group of internal combustion engines having known operating characteristics.

25. The system of claim 23 wherein the means for classifying the engine comprises:
means for applying a transformation matrix to the diagnostic envelope so as to represent the diagnostic envelope with a predetermined number of principal components;
means for determining a spatial position of each predetermined number of principal components within a principal component space; and
means for monitoring change of the spatial position of each predetermined number of principal components within the principal component space.

26. The system of claim 23 wherein the means for classifying the internal combustion engine comprises means for applying a fuzzy logic classifier to the diagnostic envelope.

27. The system of claim 22 wherein the internal combustion engine is partially assembled and the measurements are generated during a cold test of the internal combustion engine.

28. The system of claim 22 further comprising:

means for generating a transformation matrix for use in representing the diagnostic envelope with a predetermined number of principal components; and means for classifying the internal combustion engine based on the transformation matrix and the diagnostic envelope.

29. The system of claim 28 wherein the means for classifying the internal combustion engine comprises:

means for applying the transformation matrix to the diagnostic envelope so as to represent the diagnostic envelope with a predetermined number of principal components; and means for comparing each of the predetermined number of principal components to corresponding principal components representing a plurality of diagnostic envelopes generated utilizing a group of internal combustion engines having known operating characteristics.

30. A system for processing measurements from an internal combustion engine having a rotatable crankshaft wherein each measurement corresponds to an angular position of the crankshaft, the system comprising:

a motor coupled to the crankshaft for rotating the crankshaft;

at least one sensor in contact with the internal combustion engine for generating a signal indicative of vibrational activity of the internal combustion engine;

a position sensor for generating a signal indicative of an angular position of the crankshaft;

a processor in communication with the at least one sensor and the position sensor for filtering the signals from the at least one sensor to produce a series of filtered signal values wherein each filtered signal value represents a predetermined number of neighboring signal values, the processor also being operative to combine the filtered signal values which correspond to a particular angular position of the crankshaft and to subtract one of a series of predetermined values, representing systematic vibrational activity at a particular angular position of the crankshaft, from each corresponding combined signal value so as to produce a diagnostic envelope which is indicative of engine condition.

* * * * *